No. 732,812. PATENTED JULY 7, 1903.
J. C. ANDERSON.
SPARKING PLUG.
APPLICATION FILED JULY 31, 1901.
NO MODEL.
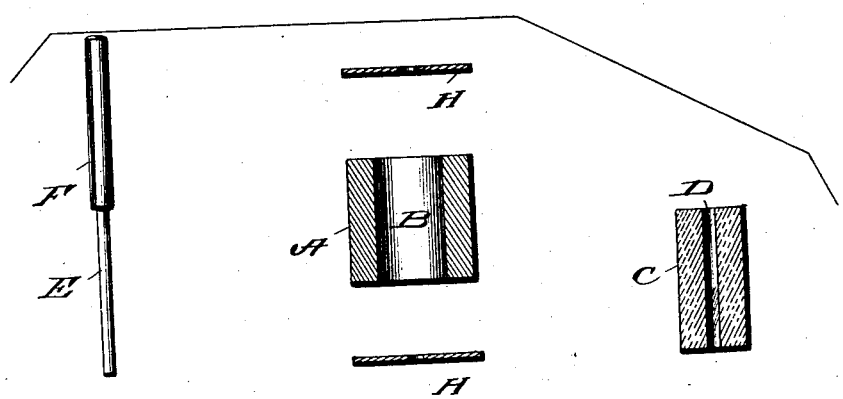
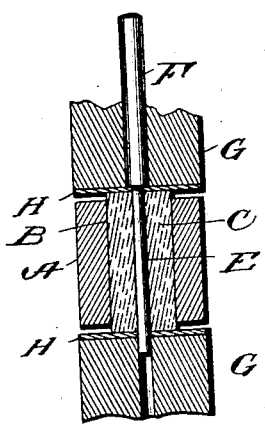
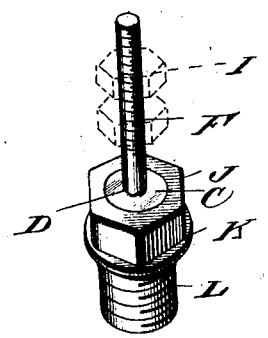
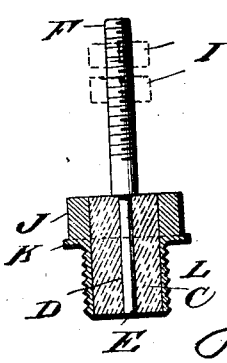
Inventor
James C. Anderson
Witnesses
By Wm C. McIntire
Attorney No. 732,812. Patented July 7, 1903.

UNITED STATES PATENT OFFICE.

JAMES C. ANDERSON, OF HIGHLAND PARK, ILLINOIS.

SPARKING PLUG.

SPECIFICATION forming part of Letters Patent No. 732,812, dated July 7, 1903.

Application filed July 31, 1901. Serial No. 70,376. (No model.)

*To all whom it may concern:*

Be it known that I, JAMES C. ANDERSON, a citizen of the United States, residing at Highland Park, in the county of Lake and State of Illinois, have invented certain new and useful Improvements in Sparking Plugs; and I do hereby declare the following to be a full, clear, and exact description of the invention, such as will enable others skilled in the art to which it appertains to make and use the same.

My invention relates to certain new and useful improvements in sparking plugs for gas-engines and in the method of making the same.

In the use of sparking plugs in gas-engines the conditions are such that many difficulties are encountered in making them effective and durable.

It is necessary that the connection between the plug and the explosion-chamber of the engine should be absolutely air-tight to prevent any escape of the commingled compressed air and hydrocarbon, and it is also important in the highest degree that complete insulation should be made. In making the air-tight joint two difficulties are experienced, to wit: If the plug be screwed up tightly, such action tends to crack or break the insulating material, and if the joint be made tight by the use of a packing the material—such, for instance, as asbestos, which is a non-conductor of comparatively poor efficiency—is liable to absorb the oil or greases from the explosion-chamber, which tends to short-circuit the current.

It has been proposed to use porcelain and bodies other than glass as the insulating material in sparking plugs; but the difficulty or impossibility of making a tight joint directly between the porcelain or other bodies and its surrounding shell or case has rendered it necessary to employ a packing, with the consequent disadvantages hereinbefore referred to. Another objection to the use of such bodies and in the ordinary manner has been the liability of its fracture or of its being blown out of its seat and packing by the force of the explosions recurring in the explosive-chamber. It is desirable, however, that glass should be used, because of its high quality of insulation and for the reason that it is important that the sparking plug should be of small or circumscribed proportions, a plug with glass insulation and of small dimensions being more effective than a much larger plug using other insulating material.

My invention has for its object to provide a sparking plug with glass insulation and having such characteristics, as the result of the method of its manufacture, that it may be screwed up tightly in its seat to make an air-tight joint without the use of any packing calculated to short-circuit the current and not liable to the fracture of the insulating-body or of its being blown out by the repeated discharges within the explosion-chamber.

With these ends in view my invention consists, broadly, of a sparking plug embodying in its organization a steel casing threaded for proper securement within the wall of the explosion-chamber of an engine, a central conducting core or pole, and an insulating-body surrounding the core or pole and between the same and the steel casing, compressed and brought into such union or homogeneous relation with the metal of the core and the casing as to be inseparable therefrom and to constitute what I denominate a "quasi weld" between the glass and metal during the method of manufacture, all as will be hereinafter and in detail explained.

In order that those skilled in the art to which my invention appertains may know how to make my improved sparking plug and to fully appreciate all of its advantages, I will proceed to describe its construction and the method of making the same, referring by letters to the accompanying drawings, in which—

Figure 1 represents the several parts employed in making up the finished article. Fig. 2 represents in section the several parts shown in Fig. 1 in assembled relation between a pair of dies prior to being subjected to compression between such dies. Fig. 3 is a perspective view of the plug in its completed condition, and Fig. 4 is a longitudinal central section of the same with the central core or pole shown in elevation.

Similar letters of reference indicate like parts in the several figures of the drawings.

A is a cylinder or ring of steel cored out centrally, as shown at B, and adapted to receive a loosely-fitting tube of glass C, which in turn is provided with a central longitudinal passage D, adapted to receive the reduced portion E of a metal core F, which constitutes the electric pole of the finished plug.

The glass tube C bears such relation in its dimensions to the cylinder A and the reduced portion E of the metal core F that when the several parts are assembled, as shown at Fig. 2, the glass tube will extend a short distance beyond each end of the cylinder A, and when acted upon by the dies G G in an ordinary press the apparent excess of glass in the tube C will be disposed of in making close contact with the cylinder or ring A and the portion E of the core F, as clearly shown at Fig. 4.

When the several parts A, C, and F are all assembled, as shown at Fig. 2, and disks of mica H are located as shown, they are subjected to heat of such a degree as to render the glass tube C viscid or capable of compression, and they are then subjected to pressure between dies G in any suitable press, the heat of the metal constituting the cylinder or ring A and the core or pole F and the heat and condition of the glass tube C are such that the surplus of glass extending above and below the ends of the ring A is taken up by the movement of the body of the tube into close contact with the cylinder and core, as heretofore described, and an intimate and close cohesion or union, which I have heretofore denominated as a "quasi weld," is made between the glass and the metal.

The mica disks H, through which the reduced portion E of the core F passes, constitute shields to prevent the glass C and ring A from attaching themselves to the faces of the dies G, and after the parts have remained for a short time between the dies the latter are separated and the product is removed. When cold and in condition to do so, the rough product is machined into the condition shown at Figs. 3 and 4, the projecting end of the core or pole F being threaded and adapted to receive binding-nuts I I, the upper or outer portion of the cylinder or ring A being formed into a nut-head J and flange K, while the lower and reduced portion is threaded, as shown at L, Fig. 4, so that by the use of a wrench upon the nut-head J the plug may be secured tightly within a suitably-threaded seat in the wall of the explosion-chamber of an engine wherein the spark is to be made by the current passing from the sparking battery through suitable connections between it and the binding-nuts I I in an obvious or well-known manner.

The completed plug, as shown, is designed to be used in pairs disposed in opposite sides of the explosion-chamber in such manner as to create an arc within which the spark is made.

In subjecting the several parts of my improved plug to the action of heat, as described, the characteristics and properties of the metal and glass are such that in the cooling and necessarily contractive action thereof, which is of a greater degree in the ring A than the body of glass C, the former by its contractive action constitutes an additional force for effecting the quasi welding or compressive action which takes place between the metal and the glass.

By my improved method of manufacture, which involves the generic idea of heating the several parts of the plug to such a degree as to render the insulating material viscid or capable of compression, I am enabled to compress the said insulating material flush with the ends of the ring or casing and to thus completely house the insulating material and to protect it from the disintegrating or moving effect otherwise produced by the recurring explosions or resulting from the changes of temperature.

While as I have practiced my invention I prefer to use glass as the insulating material and have been enabled to produce a substantially perfect attachment or quasi weld of the glass and the metal parts of the plug, I do not wish to be confined to the use of glass or to any particular extent of welding action, for I may use any other suitable insulating-body which is capable of being put into a viscid or compressible condition and may make the necessary close or removable relation between the several parts by suitably roughening or grooving the metal portions and compressing the insulating material into such roughened or grooved parts to constitute binding or keys, the generic feature of my invention resting in the broad idea, as stated, of subjecting the several parts of the plug to the action of heat and pressure to make close mechanical contact between the metal portions and the insulating material and to completely house the insulating material throughout its entire length.

Having described the construction of my improved plug and its characteristics resulting from the method of manufacture, what I claim as new, and desire to secure by Letters Patent, is—

1. A sparking plug for gas-engines composed of an outer metal ring or casing adapted to be fitted within a chamber of a gas-engine, an interior metal core or pole, and a body of insulating material surrounding the core or pole and between it and the ring or casing and in actual and mechanically constant and fixed union and weld with said core or pole and casing, substantially as and for the purposes set forth.

2. As a new article of manufacture a sparking plug composed of an outer metal ring or casing adapted to be secured within the explosion-chamber of a gas-engine, an interior metal core or pole, and an insulating-body of glass between the ring or casing and the core or pole, and in permanent and fixed union and weld with said casing and core or pole, substantially as set forth.

3. The method herein described for manufacturing sparking plugs, which consists in assembling a metal ring or casing, a metal core or pole, insulating material between the ring or casing and the core or pole, subjecting the insulating material to heat to produce a viscid or compressible condition of the same, and finally subjecting the insulating material to pressure and forcing it into fixed and constant union and weld with the metal portions, substantially as and for the purposes set forth.

In testimony whereof I affix my signature in presence of two witnesses.

JAMES C. ANDERSON.

Witnesses:
 D. G. STUART,
 JNO. J. HARROWER.